(12) United States Patent
Penny

(10) Patent No.: US 6,865,869 B2
(45) Date of Patent: Mar. 15, 2005

(54) AIRBOAT WITH AQUATIC VEGETATION SHREDDING ASSEMBLY

(75) Inventor: David M. Penny, Lawrence, KS (US)

(73) Assignee: The Master's Dredging Company, Inc., Lawrence, KS (US)

( * ) Notice: Subject to any disclaimer, the term of this patent is extended or adjusted under 35 U.S.C. 154(b) by 0 days.

(21) Appl. No.: 10/356,178

(22) Filed: Jan. 30, 2003

(65) Prior Publication Data

US 2003/0110747 A1 Jun. 19, 2003

Related U.S. Application Data

(63) Continuation of application No. 09/769,661, filed on Jan. 25, 2001, now abandoned.

(51) Int. Cl.$^7$ ............................................... A01D 44/00
(52) U.S. Cl. ............................................................ 56/8
(58) Field of Search .......................... 56/8, 9, 14.7, 289, 56/293; 440/37, 12.5, 12.51, 12.56

(56) References Cited

U.S. PATENT DOCUMENTS

| | | | |
|---|---|---|---|
| 1,795,003 A | * 3/1931 | Allen | ................................. 56/9 |
| 2,635,406 A | * 4/1953 | Chauvin | ............................. 56/8 |
| 4,141,308 A | * 2/1979 | Gainey | ....................... 210/242.1 |
| 4,177,624 A | * 12/1979 | Kelpin | ............................... 56/9 |
| 5,189,867 A | * 3/1993 | Schmidt | ............................ 56/8 |
| 5,372,001 A | * 12/1994 | Olson et al. | ....................... 56/8 |
| 5,447,018 A | * 9/1995 | Harvey-Rioux et al. | .......... 56/9 |
| 5,542,240 A | * 8/1996 | Snider et al. | ...................... 56/8 |
| 5,551,900 A | * 9/1996 | Dauffenbach et al. | ........ 440/111 |
| 5,603,204 A | * 2/1997 | Harvey-Rioux et al. | .......... 56/9 |
| 6,158,960 A | * 12/2000 | Marsi | ............................ 416/43 |
| 6,725,637 B2 | * 4/2004 | Snider et al. | ...................... 56/8 |

* cited by examiner

*Primary Examiner*—Thomas B. Will
*Assistant Examiner*—Nathan S Mammen
(74) *Attorney, Agent, or Firm*—Hovey Williams LLP

(57) ABSTRACT

An airboat having aquatic vegetation shredder includes an airboat having a buoyant hull and an aquatic vegetation shredding assembly supported on the hull. The airboat is driven by a propulsion assembly including a propeller that revolves in the air. These features cooperatively provide a low draft vessel that is capable of relatively higher forward speeds than other aquatic vegetation shredders and particularly effective in shallow water environments. Various alternative configurations of the shredding assembly are disclosed including upright and fore-and-aft shaft orientations for the cutting assembly and a drum and knife cutting assembly.

8 Claims, 6 Drawing Sheets

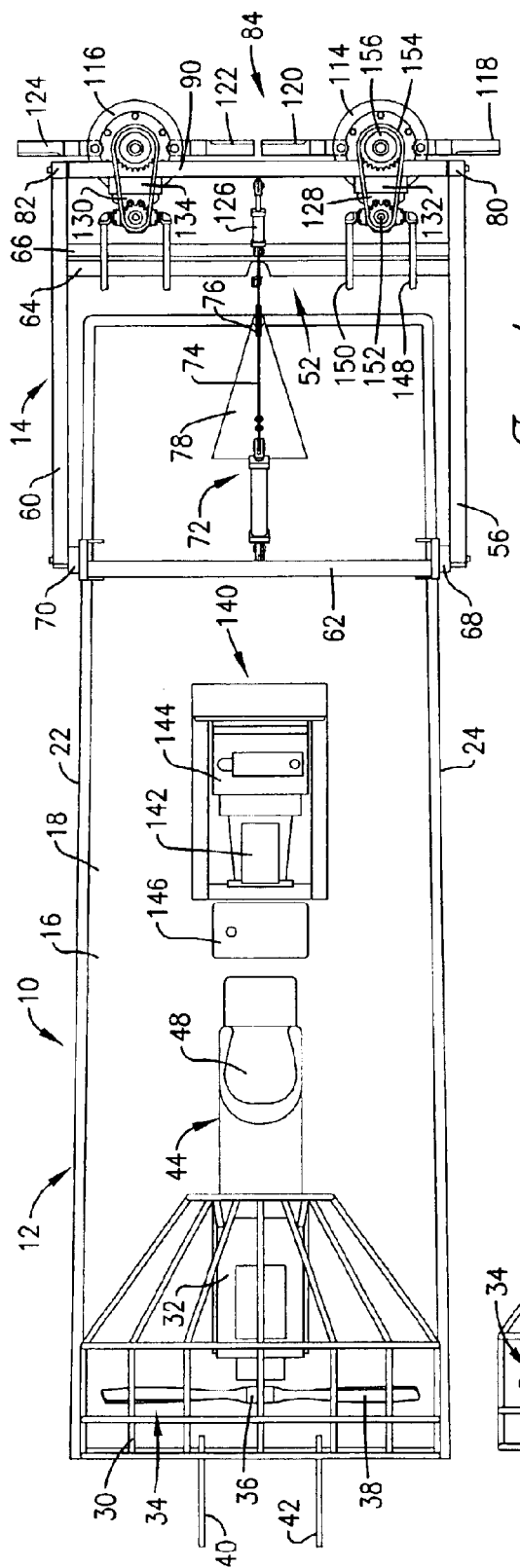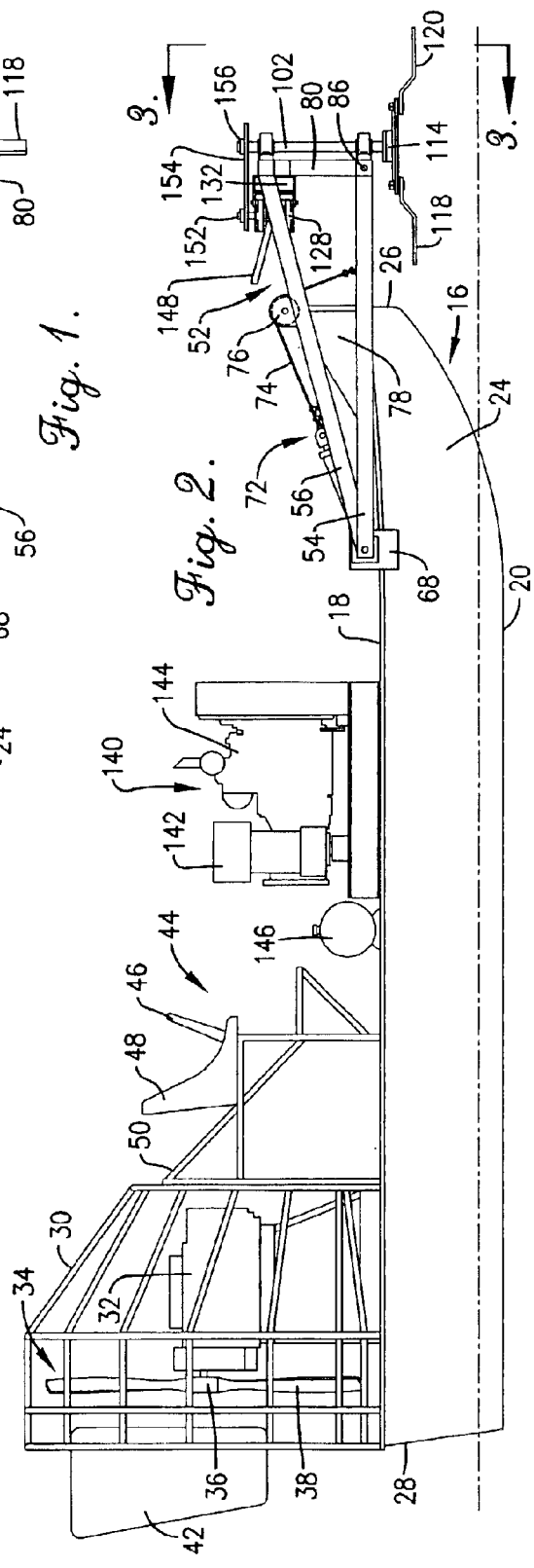

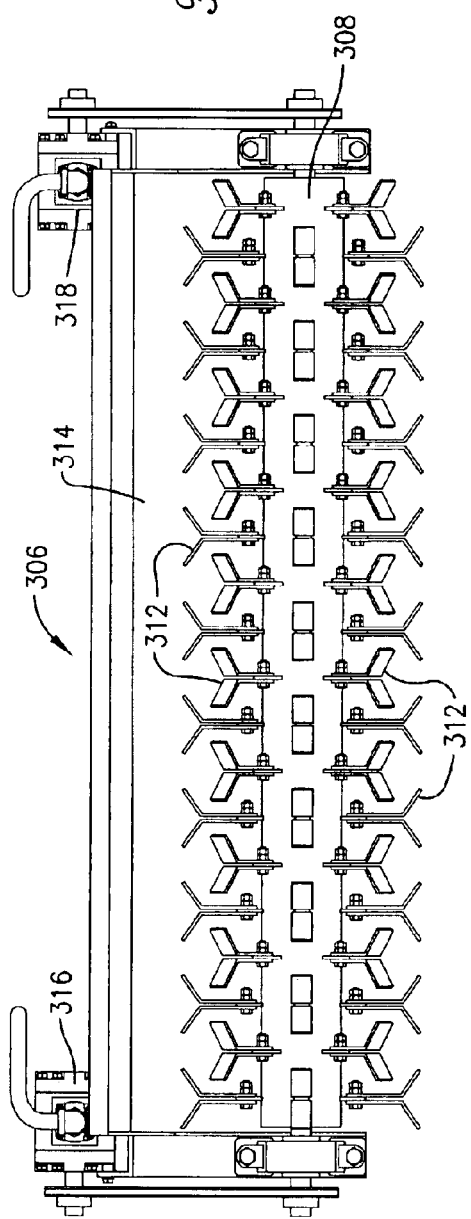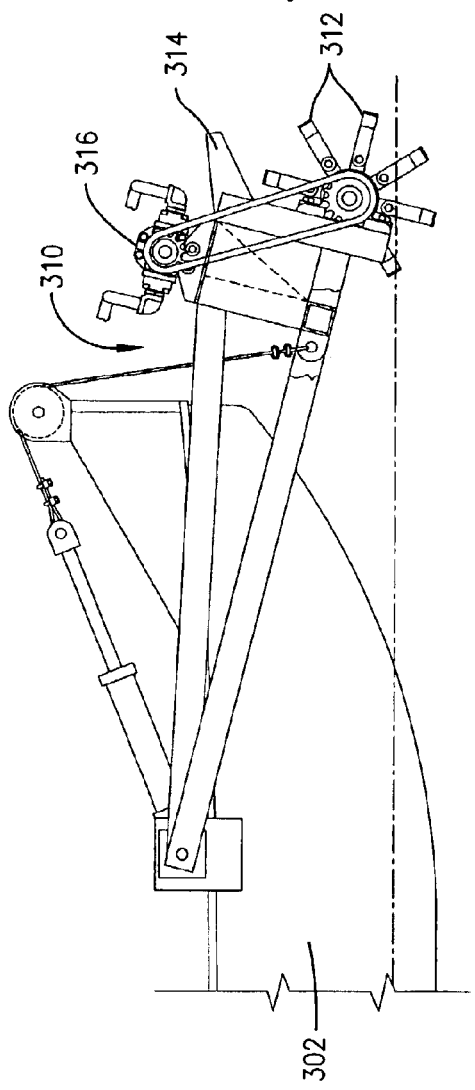

AIRBOAT WITH AQUATIC VEGETATION SHREDDING ASSEMBLY

RELATED APPLICATIONS

This is a continuation application of U.S. Ser. No. 09/769,661, filed Jan. 25, 2001 now abandoned, which is hereby incorporated by reference herein.

BACKGROUND OF THE INVENTION

1. Field of the Invention

The present invention relates generally to equipment for shredding, harvesting, destroying or otherwise processing aquatic vegetation. More specifically, the present invention concerns an airboat provided with an aquatic vegetation shredding assembly.

2. Discussion of Prior Art

Aquatic vegetation can be devastating to both marine operations and the aquatic ecosystem. Unfortunately, most conventional expedients are ineffective in destroying or otherwise controlling such vegetation. These problems have previously been identified in our U.S. Letters Patents, both of which are assigned of record to the assignee of the present invention and are identified as follows: U.S. Pat. No. 6,023,920 entitled APPARATUS FOR DESTROYING AQUATIC VEGETATION; and U.S. Pat. No. 6,116,004 entitled AQUATIC VEGETATION DESTROYER.

Our prior inventions address these problems by providing, among other things, a design that is particularly successful in delivering vegetation to the shredding assembly and a design for shredding vegetation both generally at the water surface and well below the water surface to ensure that at least most of the plant is shredded. We have now determined that, in some instances, it would also be beneficial to have an aquatic vegetation shredder that is particularly designed for use in shallow water and in no water conditions (e.g., changes in the water level of a body of water may leave aquatic vegetation growing on dry land).

OBJECTS AND SUMMARY OF THE INVENTION

Responsive to these and other problems, an important object of the present invention is to provide a device that is capable of eliminating the troubles presented by aquatic vegetation, as noted in our U.S. Letters Patents. It is also an important object of the present invention to provide a machine that is capable of destroying aquatic vegetation in or around shallow water and no water conditions. Another important object of the present invention is to provide an aquatic vegetation shredder that can shred vegetation generally at the water surface as well as below the water surface.

In accordance with these and other objects evident from the following description of the preferred embodiment, the present invention concerns an airboat provided with an aquatic vegetation shredding assembly. The airboat has a buoyant hull, and an aquatic vegetation shredding assembly is supported on the hull. The airboat is driven by a propulsion assembly including a propeller that revolves in the air. These features cooperatively provide a low draft vessel that is capable of relatively higher forward speeds than other aquatic vegetation shredders (e.g., the airboat with assembly can transport to and from off-shore shredding locations in less time than current shredders) and particularly effective in shallow water and no water environments.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 1 is a top plan view of an aquatic vegetation shredder constructed in accordance with the principles of the present invention, wherein the apparatus comprises an airboat supporting an aquatic vegetation shredding assembly;

FIG. 2 is a side elevational view of the machine shown in FIG. 1;

FIG. 12 is an enlarged front elevational view of the cutting assembly taken substantially along line 12—12 of FIG. 11; and FIG. 13 is an enlarged, fragmentary side view of the bow end of the machine shown in FIG. 10, particularly illustrating the shredding assembly in a lowered position.

DETAILED DESCRIPTION OF THE PREFERRED EMBODIMENTS

Figure 3:
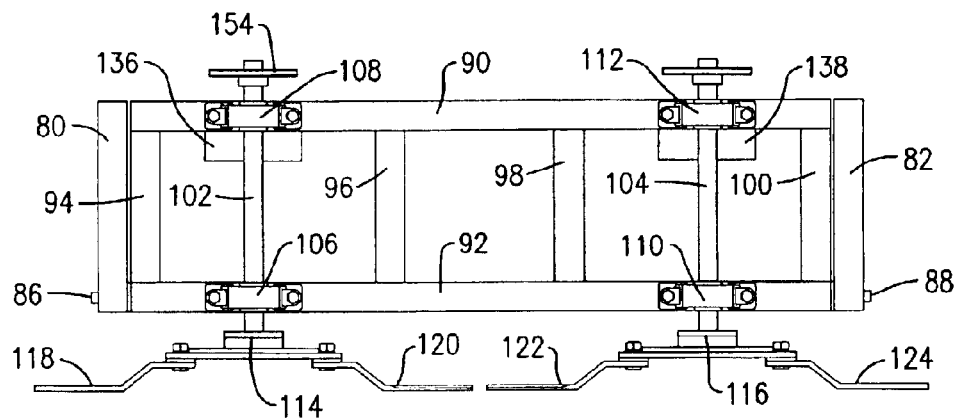
FIG. 3 is an enlarged front cross sectional view of the machine taken generally along line 3—3 of FIG. 2, particularly showing the aquatic vegetation shredding assembly having the generally horizontal cutters mounted on respective upright shafts.

Turning initially to FIG. 1, the aquatic vegetation shredder 10 selected for illustration includes an airboat 12 and an aquatic vegetation shredding assembly 14 mounted to the bow end of the airboat 12. The airboat 12 includes a low draft hull 16. The hull 16 has a generally rectangular, box-like configuration and includes a top deck wall 18, a downwardly spaced bottom wall 20, opposite port and starboard sidewalls 22 and 24, and opposite bow and stem endwalls 26 and 28. The top deck wall 18 is a solid surface providing a sealed hull 16 to prevent the hull 16 from filling with water and shredded debris. As shown in FIG. 2, the bottom wall 20 slopes upwardly at the bow end of the airboat 12 converging with the bow endwall 26. As shown in FIG. 2 by the dashed water line, the airboat hull 16 is a low draft hull displacing relatively small amounts of water when in operation. In the preferred embodiment, the hull 16 has a bow-to-stern length of approximately twenty feet and a width or beam of approximately eight feet. The eight foot beam allows the airboat 12 to be trailered on a standard tractor pulled semi-trailer without any overwidth problems. However, the principles of the present invention are equally applicable to various other hull designs having a multitude of varied dimensions so long as the draft allows the airboat 12 to operate in shallow water and no water conditions. For example, the airboat could have a double-hull, or triple-hull design and accommodate twin or triple engines respectively.

Those ordinarily skilled in the art will appreciate that airboats are commonly operated in shallow waters having vegetation protruding through the surface (e.g., a swamp) or in no water conditions where vegetation exists. Sometimes this vegetation will capture or seize the airboat. It is therefore desirable to slicken the bottom of the airboat hull. As is commonly done on airboats to slicken the hull, the bottom wall 20 of the airboat hull 16 is coated with polyethylene. However, the principles of the present invention are equally applicable to various other methods of slickening the hull 16 including coating the hull 16 with materials other than polyethylene or utilizing sprayers that forwardly spray slickening agents such as soap or diesel fuel on the hull and/or the vegetation. In some environments the aquatic vegetation can become so entangled and dense that the vegetation forms a virtual floating island. It is desirable for the airboat 12 to have a slickened hull 16 that enables the airboat 12 to operate on these floating islands. It is also desirable for the airboat 12 to operate in no water conditions, for example on and around the banks of a body of water or where the water level in a body of water changes leaving aquatic vegetation growing on dry land.

At the stern end of the airboat 12 is a cage 30 housing an internal combustion engine 32 drivingly coupled to a propeller 34. The cage 30 is configured and constructed as is commonly known in the art. The engine 32 can be variously sized and powered so long as it produces the required propeller rotation to adequately propel the total weight of the airboat 12 and shredding assembly 14. In the usual manner, the engine 32 is supported, so that it rests above the surface of the top deck wall 18. The engine 32 is drivingly coupled to the propeller 34 in the usual manner. The propeller 34 includes a hub 36 and a plurality of fan blades 38 coupled to the hub 36. The blades 38 and the hub 36 are configured in a known manner so that the pitch angle of each of the blades 38 can be varied. That is, rotation of the propeller 34 in the same rotational direction can propel the airboat 12 both forwardly and rearwardly depending on the pitch angle of the blades 38.

Hingedly supported on the cage 30 in the usual manner are lateral steering rudders 40 and 42. The engine 32, propeller 34 and steering rudders 40 and 42 are conveniently controlled from a cab 44 adjacent the cage 30. In the usual manner, the cab 44 includes a rudder guide 46, a seat 48, and the supporting framework 50. However, the cab 44 further includes a cab guard (not shown) that separates the cage 30 from the seat 48 so that when the propeller 34 is propelling the airboat 12 rearwardly, the airboat 12 operator seated in the seat 48 is shielded from the moving air generated by the propeller 34. It is within the ambit of the present invention to include alternative variously constructed propulsion means (e.g., multiple propellers, bow mounted propeller, etc.). As previously discussed, the propulsion means could include multiple engines. In addition, the cab could be located at the bow end of the airboat and include a windshield.

Those ordinarily skilled in the art will appreciate that the illustrated airboat 12 is similar in many respects to standard airboat constructions. It is therefore within the ambit of the present invention to utilize a commercially available airboat and make any necessary modifications to it. A suitable airboat is available under the designation TRAILBOSS from Marshland Marine of Baytown, Tex. It has particularly been determined that the 20'×8' Model and the 24'×8' Model of the TRAILBOSS is well suited for use in the illustrated embodiment.

Figure 5:
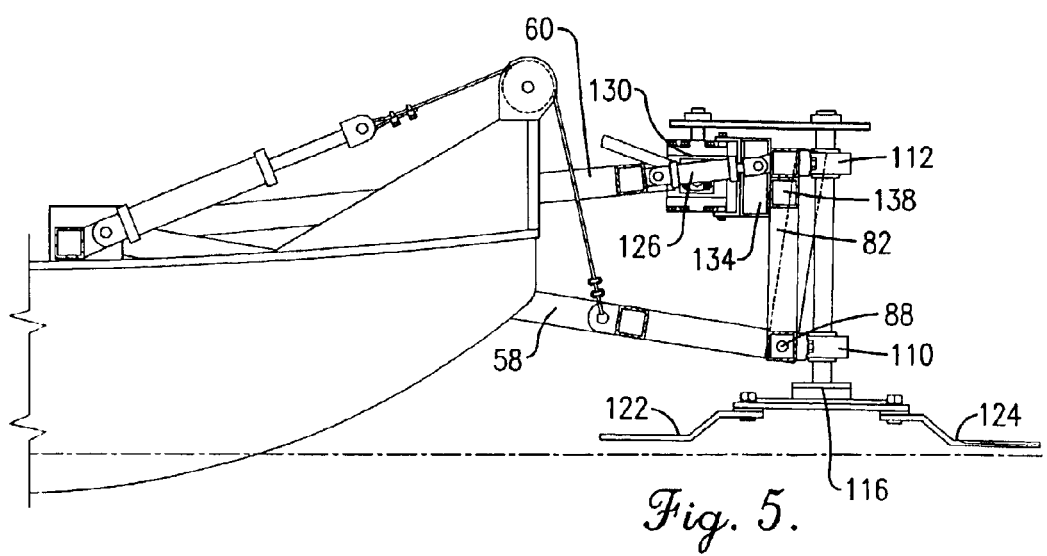
FIG. 5 is an enlarged, fragmentary side view of the bow end of the machine similar to FIG. 4, but illustrating the cutting assembly swung upwardly relative to the primary frame to reposition the cutters in the horizontal orientation.

The aquatic vegetation shredding assembly 14 is mounted to the airboat 12 at the bow end. In particular, a frame 52 swingably mounted to the airboat 12 includes a starboard pair of fore-and-aft arms 54 and 56 and a port pair of fore-and-aft arms 58 and 60. As shown in FIG. 2, the starboard pair of arms 54 and 56 are joined at their rearward ends and form two sides of a triangle. The port pair of arms 58 and 60 are similarly configured. The starboard and port pairs of arms are fixedly connected by transverse bars 62, 64 and 66 (see FIGS. 1 and 5). Transverse bar 66 is fixed between fore-and-aft arms 56 and 60 adjacent their forward ends. Transverse bar 64 is fixed between fore-and-aft arms 54 and 58 adjacent their forward ends. The starboard and port pairs of arms are pivotally attached to the hull 16 by bracket assemblies 68 and 70 respectively, and are disposed outwardly from the hull 16 so as to permit swinging of the frame 52 below the top deck wall 18. Transverse bar 62 is fixed between bracket assemblies 68 and 70. Perhaps as best shown in FIG. 5, swinging of the frame 52 is controlled by a double-acting hydraulic piston and cylinder assembly 72 pivotally mounted to the transverse bar 62. A cable 74 is connected between the hydraulic assembly 70 and the transverse bar 66, such that the frame 52 swings downwardly as the assembly 72 extends, and the frame 52 swings upwardly as the assembly 72 retracts. It will be noted that the cable 74 partially entrains a pulley 76 rotatably mounted to the hull 16 by a stand 78.

As previously described, the starboard arms 54 and 56 form two sides of a triangle (as do the port arms 58 and 60). Attached to the forward ends of the starboard and port arms, completing the triangle, are the end arms 80 and 82. Pivotally mounted to the frame 52, between the endarms 80 and 82, is a cutting assembly 84 (see FIGS. 1 and 2). The cutting assembly 84 is pivotally mounted to the frame 52 on pivots 86 and 88. As shown in FIG. 3, the assembly 84 includes an upper horizontal support member 90, a downwardly spaced lower horizontal support member 92, and vertical support members 94, 96, 98 and 100. Rotatably coupled to the assembly 84 are upright shafts 102 and 104. The shafts 102 and 104 are each rotatably supported on the horizontal support members 90 and 92 by a pair of pillow block bearings 106, 108 and 110, 112 respectively. Rigidly fixed to the lower end of each of the shafts 102 and 104 is a corresponding hub 114 and 116. Swingably mounted to each of the hubs 114 and 116 are a plurality of cutting blades 118, 120 and 122, 124 respectively. The blades 118, 120, 122, and 124 are each bolted to the corresponding hub 114 or 116 so that when the hub 114 or 116 rotates, they project in a generally radial orientation (as shown in FIG. 1); however, they are deflectable out of the general radial orientation. That is, if the blade 118, for example, strikes a rigid object (relative to the typical vegetation being shredded) such as a tree trunk, the blade 118 parries off the trunk. It is believed this mounting configuration prevents the blades 118, 120, 122 and 124 from becoming prematurely deformed and worn thereby extending the overall life of the cutting assembly 84. The blades 118, 120, 122 and 124 are pitched such that shredded vegetation is lifted away from the corresponding blade once cut. Because lifted vegetation may fall onto the shafts 102 and 104 and into the airboat 12, the shredding assembly 14 includes a vegetation shield (not shown) fixed to and extending along the face of the cutting assembly 84 and fixed to and extending between the bottom of arms 54 and 58 along the portion thereof that extends beyond the hull 16. The vegetation shield is designed to limit the amount of cut vegetation that falls against the shafts 102 and 104 and back into the airboat 12. The vegetation shield may be variously constructed and utilize alternative materials and designs (e.g., a rubber matting tied to the primary frame with rope).

Figure 4:
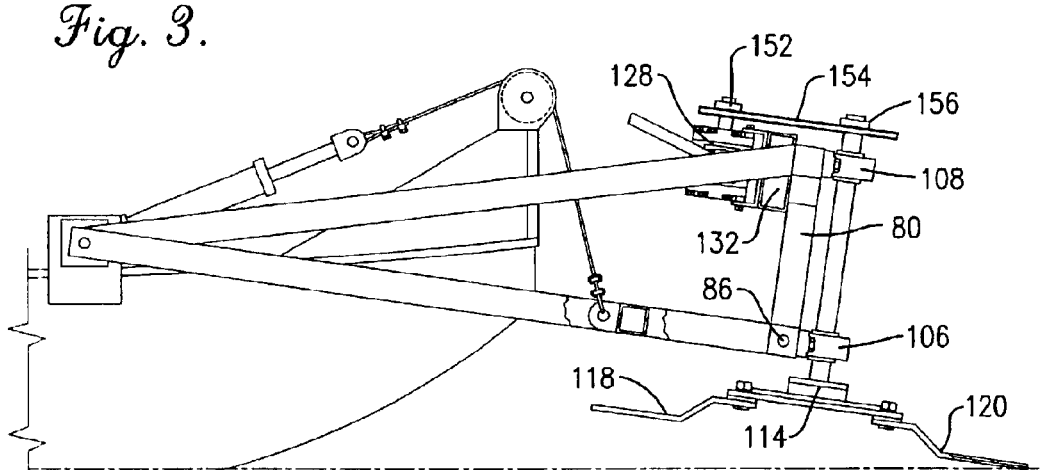
FIG. 4 is an enlarged, fragmentary side view of the bow end of the machine, particularly illustrating the primary frame of the shredding assembly swung downwardly to orient the cutters at a forwardly and downwardly sloped angle relative to horizontal.

Pivoting of the assembly 84 is controlled by a hydraulic piston and cylinder assembly 126 pivotally mounted between the transverse bar 64 and the upper horizontal member 90 (see FIGS. 1 and 5). In its unactivated position as shown in FIG. 4, the cylinder assembly 126 maintains the cutting assembly 84 vertically alligned and generally parallel with the endarms 80 and 82. As the cylinder assembly 126 retracts from the unactivated position, the cutting assembly 84 pivots toward the position shown in FIG. 5. In this way, the cutting assembly 84 can be pivotally adjusted in order to achieve the desired positioning of the cutting blades 118, 120, 122 and 124 relative to the surface of the water. For example, as shown in FIG. 5, the cutting blades 118, 120, 122 and 124 are generally parallel to the surface of the water. Although not shown, it will be appreciated that the cylinder assembly 126 may be extended, rather than retracted, from the unactivated position shown in FIG. 4 thereby causing the cutting assembly 84 to pivot away from the position shown in FIG. 5. It will be appreciated that the cutting assembly 84 can be positioned (via assemblies 72 and 126) to shred aquatic vegetation located below the surface of the water (e.g., root structures).

Each of the upright shafts 102 and 104 is driven by a reversible, variable speed hydraulic motor 128 and 130, respectively, mounted to the stem side of the assembly 84 on the corresponding motor mount 132 and 134. The motor mounts 132 and 134 are each rigidly fixed to the upper horizontal member 90 and to a corresponding motor mount support 136 and 138. The motor 128 is connected to and powered by a hydraulic power unit 140 (only partially shown). In the usual manner, the unit 140 includes a pump 142 driven by an engine 144 and a fluid reservoir 146 (see FIG. 2). A suitable engine is available from General Motors Corporation as Model No. ZZ4, rated at 350 horsepower. The unit 140 is connected to the motor 128 by the fluid circuit lines 148 and 150 (only partially shown). A drive sprocket 152 mounted on the output shaft of the motor 128 is entrained by a chain 154 that extends forwardly to wrap around a driven sprocket 156 fixed to the shaft 102. The shredding assembly 14 further includes chain guards (not shown) mounted to the cutting assembly 84 that prevent shredded debris from falling in and around the chains. The motor 128 preferably rotates the shaft 102 (and the attached blades 118 and 120) in a clockwise direction when viewed from above, as in FIG. 1. The motor 130 is essentially identical to the motor 128 and similarly connected to the shaft 104 by a chain and sprocket drive. However, the motor 130 preferably rotates the shaft 104 (and the attached blades 122 and 124) in a counterclockwise (opposite of the shaft 102) direction when viewed from above, as in FIG. 1. It is believed that with the shafts 102 and 104 configured to rotate in the preferred directions, the shredded vegetation is thrown away from the center of the boat, as is desirable. The motors 128 and 130, however, are independently operable and reversible thereby allowing for selective and varied rotation of the shafts 102 and 104. The principles of the present invention equally apply to vegetation shredders that utilize alternative forms of directing the cut vegetation away from the center of the boat, for example, both of the cutters could rotate in the same direction and present a staggered configuration such that cut vegetation is passed from blade to blade until it is thrown to one side of the airboat 12. It is also entirely within the ambit of the present invention to utilize a single cutter rather than multiple cutters as illustrated.

It has been determined that some forms of aquatic vegetation can be adequately destroyed by simply mowing it down; that is cutting off the majority of the green portion of the plant growing at or above the water surface without cutting the root system. It is believed that keeping the plant mowed down causes the plant to lose its ability to photosynthesize. This mowing method of shredding vegetation may require several passes to keep the vegetation adequately mowed down. In this regard, vegetation shredders that are slow moving are undesirable. In addition, because the root systems are not being cut, a vegetation shredder that has a cutting mechanism that can operate at or above the water surface, and therefore not drain power from the watercraft, is highly desirable. Some applications, however, also require the root systems to be cut after the above-water portion of the vegetation has been mowed and therefore it is desirable to have a shredding assembly that can perform both of these cutting applications. Accordingly, in use, the illustrated airboat having aquatic vegetation shredder 10 is designed for relatively higher speed forward travel, with the shredding assembly 14 mowing down a path through the vegetation as the airboat 12 is propelled by the propeller 34. The shredding assembly 14 is positioned so that the blades 118, 120, 122, 124 when rotated, project at or near the surface of the water (including below the water surface). In high speed conditions, the blades are preferably positioned so as not to drain the forward power of the airboat 12. The rotation of the shafts 102 and 104 in the preferred opposite directions throws the mowed vegetation away from the airboat 12. The cutting assembly 84 can be pivotally adjusted to position the blades to project below the water surface to allow shredding of vegetation growing below the water surface (e.g., root systems). In this manner, the shredder 10 can be used to shred the aquatic vegetation at the roots (either in the initial pass or on a subsequent pass after the upper potion of the vegetation has been mowed off).

In addition to a relatively higher speed of forward travel, the aquatic vegetation shredder 10 is well suited for operation in shallow water and no water conditions. Many forms of aquatic vegetation grow in shallow waters. Aquatic vegetation also grows in no water conditions, for example when the water level of a body of water changes leaving the vegetation growing on dry land. As previously noted, the principles of the present invention are equally applicable to various other shredding assembly constructions.

One such variation is illustrated in FIGS. 6–9, as an aquatic vegetation shredder 200 including an airboat 202 and an aquatic vegetation shredding assembly 204 mounted to the bow end of the airboat 202. The shredder 200 is generally similar to the machine 10 shown in FIGS. 1–5; however, the cutters of the shredding assembly 204 are disposed in a generally vertical plane and are rotatable about fore-and-aft axes. It will be appreciated that the airboat 202 is substantially similar to the airboat 12 and therefore the airboat 202 will not be described further herein. In a similar manner, the shredding assembly 204 is constructed in a somewhat similar manner as the shredding assembly 14 and therefore the similar features of the assembly 204 will only be briefly discussed. The assembly 204 is swingably mounted to the airboat 202 by a frame 206 pivotally mounted on bracket assemblies 208 and 210. The frame 206 includes starboard fore-and-aft arms 212 and 214, port fore-and-aft arms 216 and 218, and transverse bar 220 (see FIGS. 6 and 7). The shredding assembly 204 includes a cutting assembly 222; unlike the shredding assembly 14, cutting assembly 222 is rigidly fixed to the frame 206 thereby obviating the need for endarms, any pivot-enabling structure, and multiple transverse bars. Similar to shredding assembly 14, swinging of the frame 206 is controlled by a piston and cylinder assembly 224, including a cable 226, a pulley 228 and a stand 230; however, the cable 226 is fixed to the cutting assembly 222 rather than a transverse bar (see FIG. 9).

Figure 8:
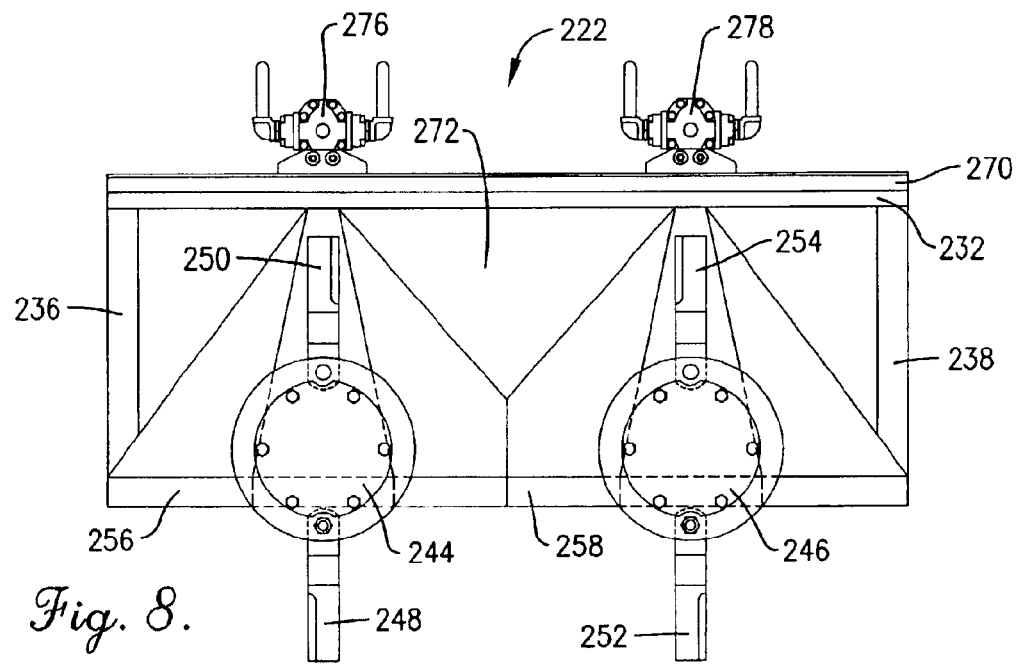
FIG. 8 is an enlarged front cross sectional view of the cutting assembly taken substantially along line 8—8 of FIG. 7.

The cutting assembly 222 includes upper and lower horizontal support members 232 and 234, and vertical support members 236 and 238 (see FIG. 8). Similar to the cutting assembly 84, the cutting assembly 222 includes shafts 240 and 242, hubs 244 and 246, and swingable cutting blades 248, 250, 252 and 254. The blades 248, 250, 252 and 254 are configured like the blades 118, 120, 122, and 124 so they project in a generally radial orientation and are deflectable out of the general radial orientation. Unlike the upright shafts 102 and 104, the shafts 240 and 242 have a fore-and-aft orientation (see FIG. 7). In order to accommodate the fore-and-aft orientation, assembly 222 includes lateral support members 256 and 258, each having a three-sided configuration and being fixed to the lower horizontal support member 234 (see FIG. 6). The port-side lateral support member 258 extends forwardly from the bow end of the airboat 202 a further distance than does the starboard-side lateral support 256 in order to support the longer length of the shaft 242 relative to the shaft 240 for reasons that will be described below. Each of the shafts 240 or 242 is rotatably supported on the lower horizontal support 234 and the corresponding lateral support 256 or 258 by a respective pair of pillow block bearings 260 and 262 or 266 (the second bearing supporting the shaft 242 is not shown). The cutting assembly 222 includes a vegetation shield assembly 268. The shield assembly 268 includes a knockdown plate 270 rigidly coupled to the upper horizontal support 232 and extending forwardly therefrom. The shield assembly 268 further includes a hood 272 extending outwardly and downwardly from the upper horizontal support 232 and adjoining the lateral support members 256 and 258 (see FIGS. 8 and 9). The plate 270 and the hood 272 form a vegetation barrier between the cutting area defined by the blades 248, 250, 252, 254 and the airboat 202, when the shredding assembly 204 is in operation. It is believed this configuration enhances the cutting action of the shredding assembly 204.

Figure 6:
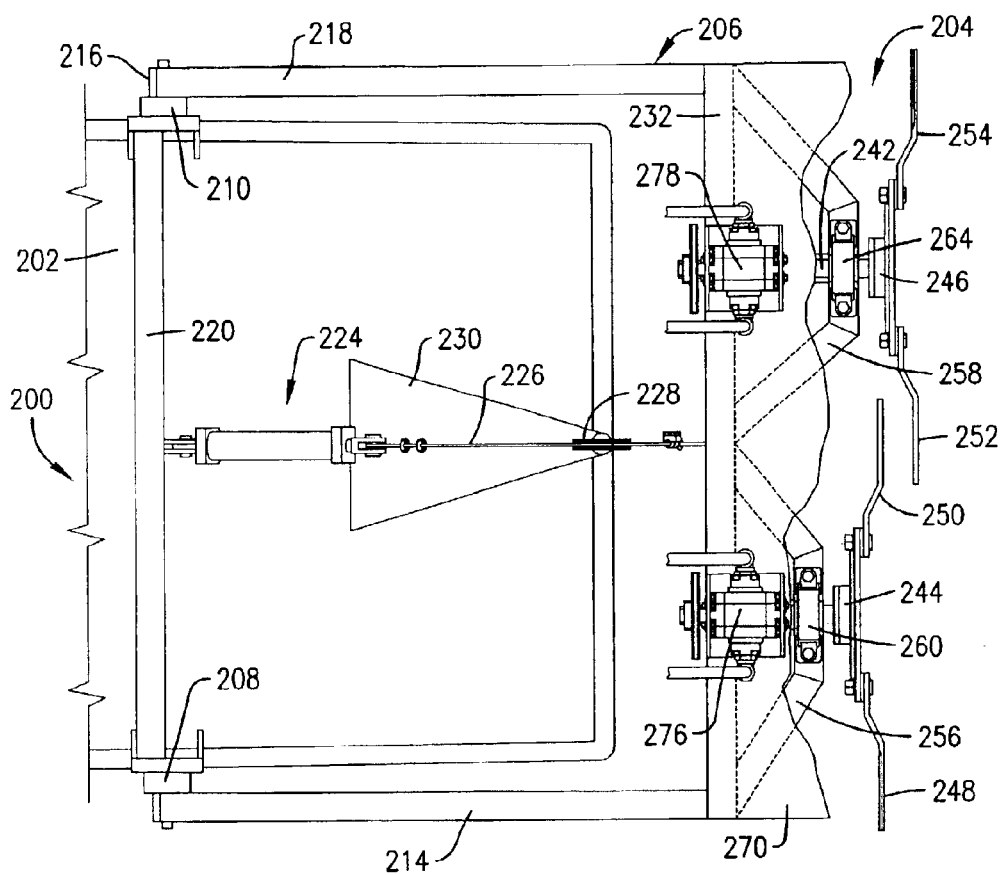
FIG. 6 is an enlarged, fragmentary top view of the bow end of a second embodiment of the present invention, wherein the machine includes cutters similar to those shown in FIGS. 1–5 but are rotatable in an upright plane.
Figure 7:
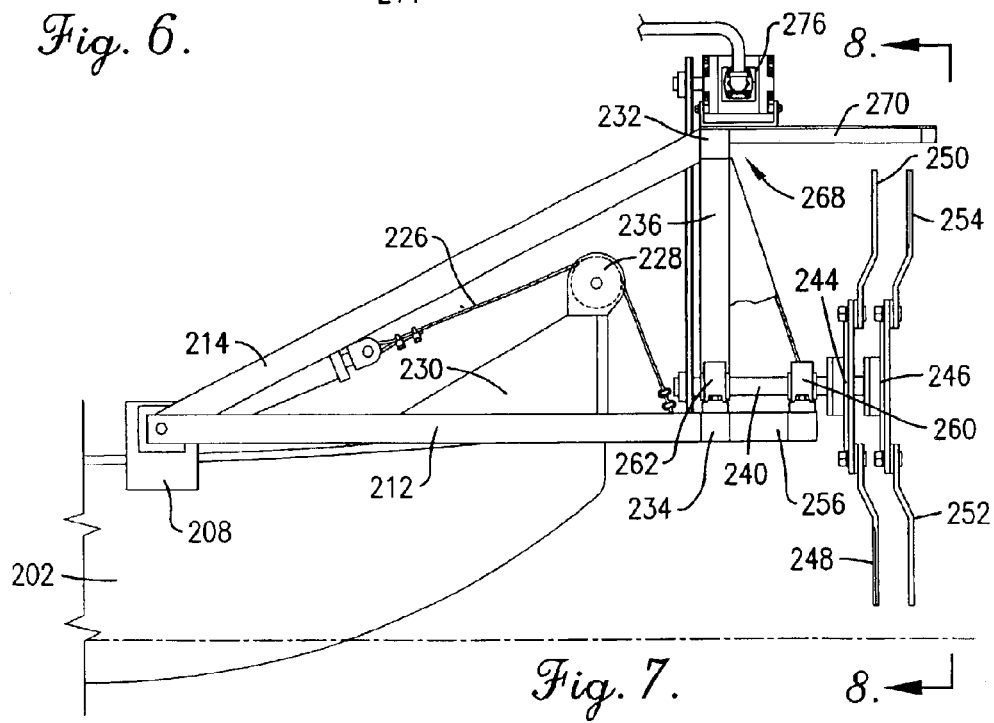
FIG. 7 is an enlarged, fragmentary side view of the bow end of the machine shown in FIG. 6 having a portion of the hood removed.
Figure 9:
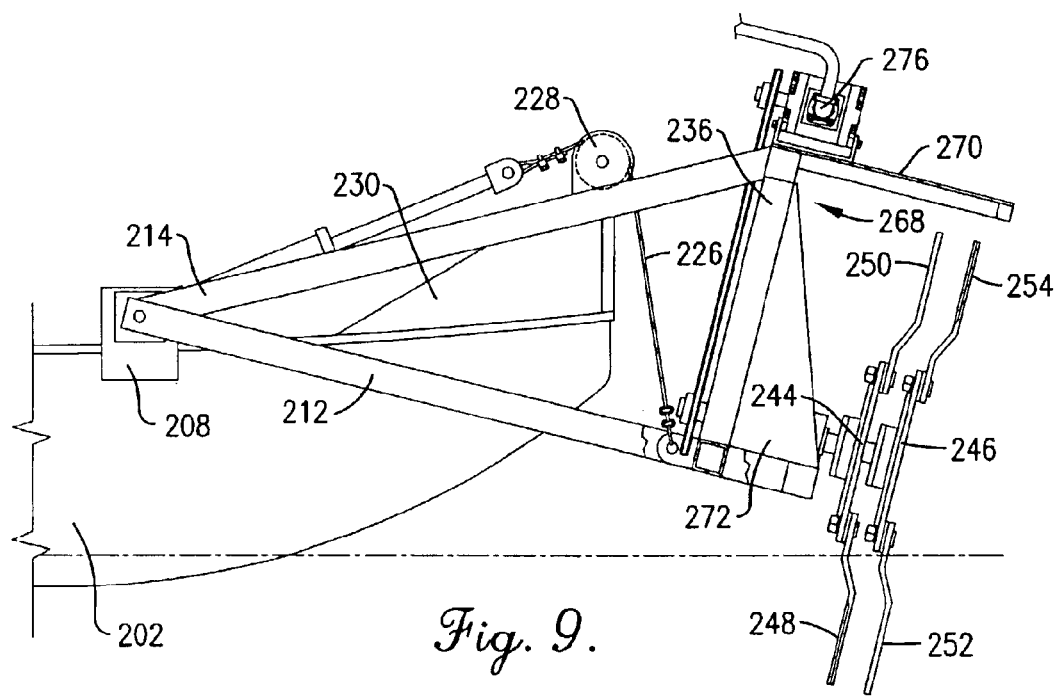
FIG. 9 is an enlarged, fragmentary side view of the bow end of the machine shown in FIG. 6 particularly illustrating the shredding assembly in a lowered position.
Figure 10:
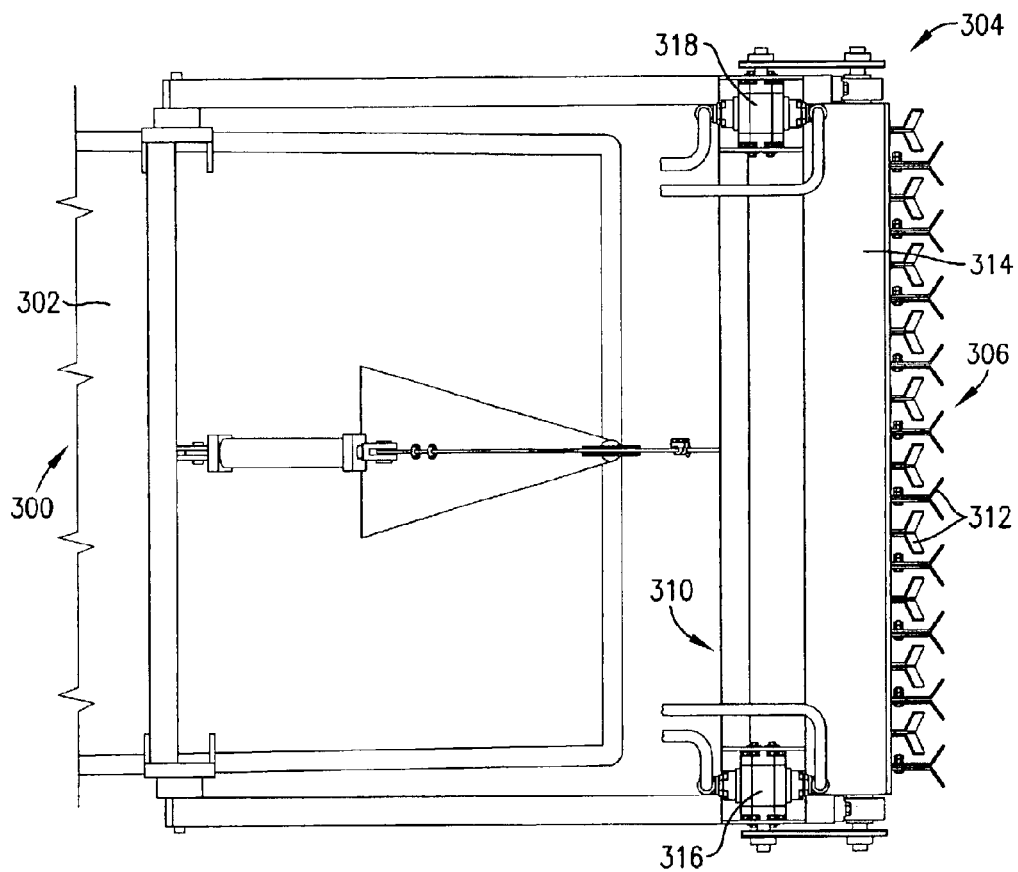
FIG. 10 is an enlarged, fragmentary top view of the bow end of a third embodiment of the invention, wherein the machine includes a laterally extending drum carrying multiple flail-type knives.
Figure 11:
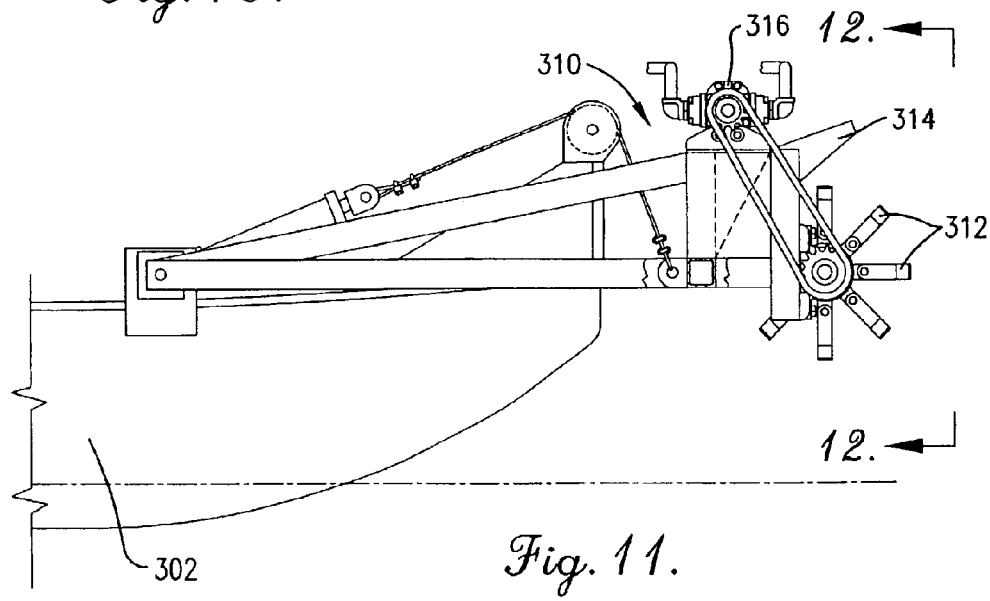
FIG. 11 is an enlarged, fragmentary side view of the bow end of the machine shown in FIG. 10, with a portion of the frame being removed.

Similar to the shredding assembly 14, the shredding assembly 204 is powered by a hydraulic power unit (not shown) that drives hydraulic motors 276 and 278. The motors 276 and 278 are mounted to the top of the knockdown plate 270 and have output shafts configured to accommodate the fore-and-aft orientation of the shafts 240 and 242. That is, the motors 276 and 278 are drivingly connected to the shafts 240 and 242 by the corresponding chains 280 and 282 that extend downwardly to the shafts 240 and 242. The motors 276 and 278 are operable to rotate the shafts 240 and 242 in varied directions such that the rotational direction of the shafts 240 and 242 can be the same or the opposite direction relative to each other. As previously discussed, the axial length of the shaft 242 is longer than the axial length of the shaft 240. This configuration provides for offset rotational planes of the blades 248 and 250 relative to the blades 252 and 254. As shown in FIG. 6, a portion of the blades 248 and 250 (when rotating) will overlap a portion of the blades 252 and 254 (when rotating); however, the offset rotational planes of the cutters prevents blade contact. It is believed this overlapping relationship allows for the maximum amount of cut vegetation to be directed away from the center of the airboat 202 as is desirable. As previously discussed, unlike the cutting assembly 84, the cutting assembly 222 is rigidly (not pivotally) fixed to the frame 206 and repositioning of the cutting assembly 222 can consequently be effected only by swinging the frame 206. Depending on the conditions, it is believed that the cutting blades 248, 250, 252, 254 need not be directly perpendicular to the surface of the water in order to provide the desired shredding of aquatic vegetation. As shown in FIGS. 6 and 9, swinging of the frame 206 adjusts the orientation of the cutting assembly 222 so that shredding of the vegetation can occur at, above or below the surface of the water.

Another variation of the shredding assembly is embodied in the aquatic vegetation shredder 300, as illustrated in FIGS. 10–13. The shredder 300 includes an airboat 302 and an aquatic vegetation shredding assembly 304 mounted to the bow end of the airboat 302. It will be appreciated that the only significant difference between the shredder 300 and the shredder 200 shown in FIGS. 6–9 is the cutting assembly 306. The assembly 306 includes a drum 308 rotatably supported on a support assembly 310, a plurality of knives 312 swingably supported on the drum 308, and a vegetation shield 314. A similar arrangement is disclosed in our U.S. Pat. No. 6,116,004, entitled AQUATIC VEGETATION SHREDDER, which is hereby incorporated by reference herein as is necessary for a full and complete understanding of the present invention. The cutting assembly 306 is powered by a hydraulic power unit (not shown) and two endmounted hydraulic motors 316 and 318. The motors 316 and 318 are operable to selectively rotate the drum 308 in either a clockwise direction or a counterclockwise direction relative to the axis of rotation.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. An aquatic vegetation shredder for shredding vegetation growing in water, said shredder comprising:
   an airboat including a buoyant hull presenting a forwardmost bow end and a rearward-most stern end,
   said hull including a pair of spaced sidewalls and a forward-most front wall extending between the sidewalls,
   said front wall comprising the bow end of the boat and extending the full width of the hull to present a substantially planar, unitary bow end, said airboat being driven by a propulsion assembly including a propeller revolving in the air; and an aquatic vegetation shredding assembly supported on the hull and being operable to shred vegetation growing in the water while the propulsion assembly propels the airboat through the water, said shredding assembly including a rotatable element extending substantially across the width of the hull and rotatable about a generally horizontal axis and a blade swingably mounted to the rotatable element, said rotatable element and swingable blade positionable into the water adjacent the bow end of the hull when shredding vegetation, said rotatable element and swingable blade being spaced from the bow end by a working space, said shredder being otherwise devoid of harvesting and cutting structure within said working space when the airboat is propelled through the water so that at least substantially all of the shredded vegetation remains in the water.

2. An aquatic vegetation shredder as claimed in claim 1, said propulsion assembly including a power source drivingly coupled to the propeller, said propeller including a plurality of fan blades, said propeller being configured to permit a pitch angle for each of the fan blades to be varied.

3. An aquatic vegetation shredder as claimed in claim 1, said aquatic vegetation shredding assembly including a frame, a shaft rotatably supported by the frame, and a vegetation shredding blade coupled to the shaft, said shaft being positioned generally ahead of the bow end of the airboat and said propeller being adjacent the stern end of the airboat.

4. An aquatic vegetation shredder as claimed in claim 3, said shaft being rotatable about a fore-and-aft extending axis.

5. An aquatic vegetation shredder as claimed in claim 4, said aquatic vegetation shredding assembly including an additional shaft spaced laterally from the first-mentioned shaft such that the shafts are in a starboard and port relationship, an additional vegetation shredding blade coupled to the additional shaft, said starboard shaft and port shaft being independently and reversibly rotatable relative to each other.

6. An aquatic vegetation shredder as claimed in claim 5, said starboard blade and port blade being rotatable in relatively offset planes, said rotating blades presenting overlapping portions.

7. An aquatic vegetation shredder as claimed in claim 1, said aquatic vegetation shredding assembly including a frame, a drum rotatably supported by the frame, and a plurality of knives swingably mounted to the drum.

8. An aquatic vegetation shredder as claimed in claim 7, said knives being arranged in rows spaced along the length of the drum, with each of said rows including a pair of said knives mounted to the drum at diametrically opposite locations.

* * * * *